Jan. 5, 1965   O. V. LINDELL   3,164,379
APPARATUS AND METHOD FOR PURIFICATION OF LIQUIDS
Filed Nov. 21, 1960   3 Sheets-Sheet 1
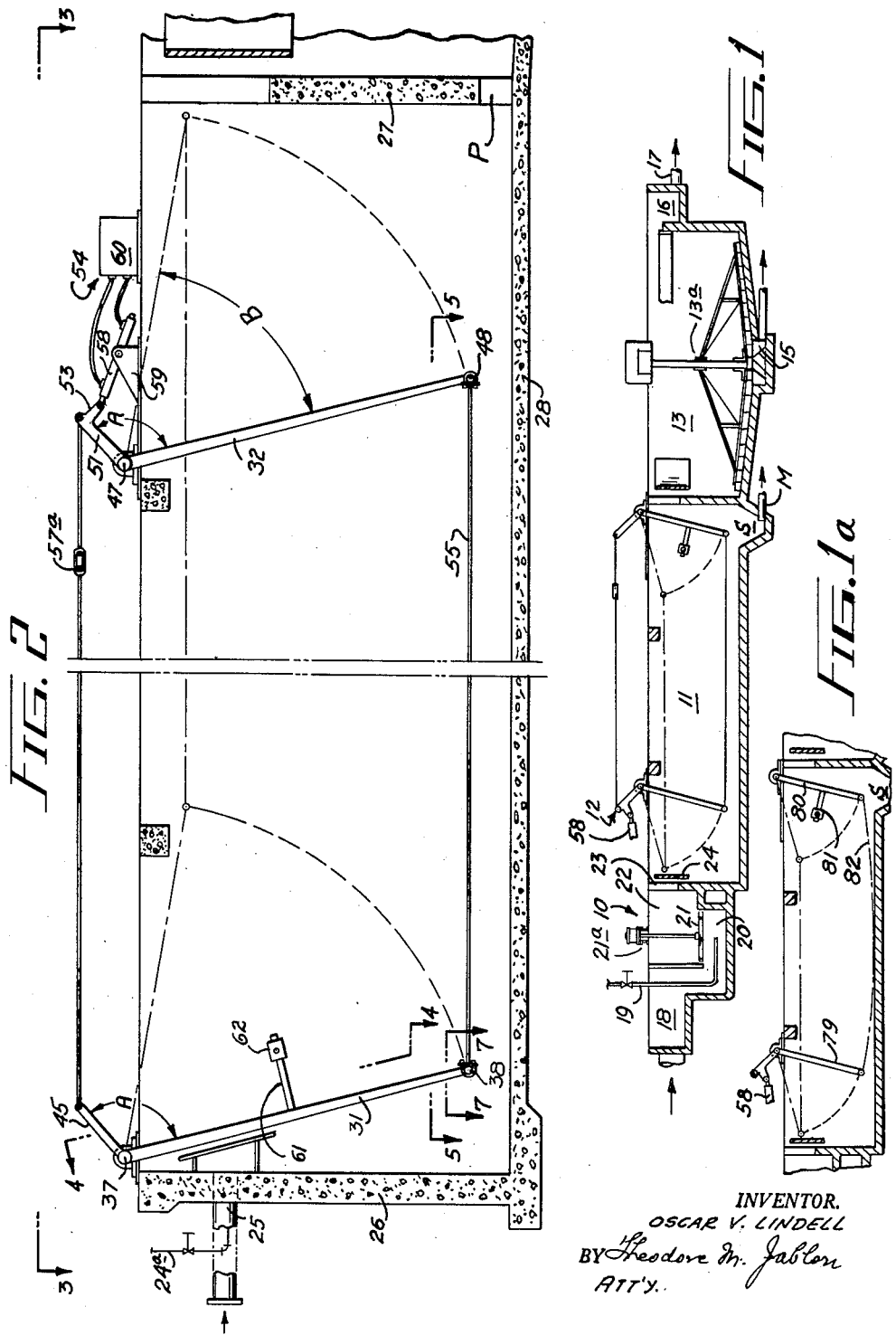
INVENTOR.
OSCAR V. LINDELL
BY Theodore M. Jablon
ATT'Y.

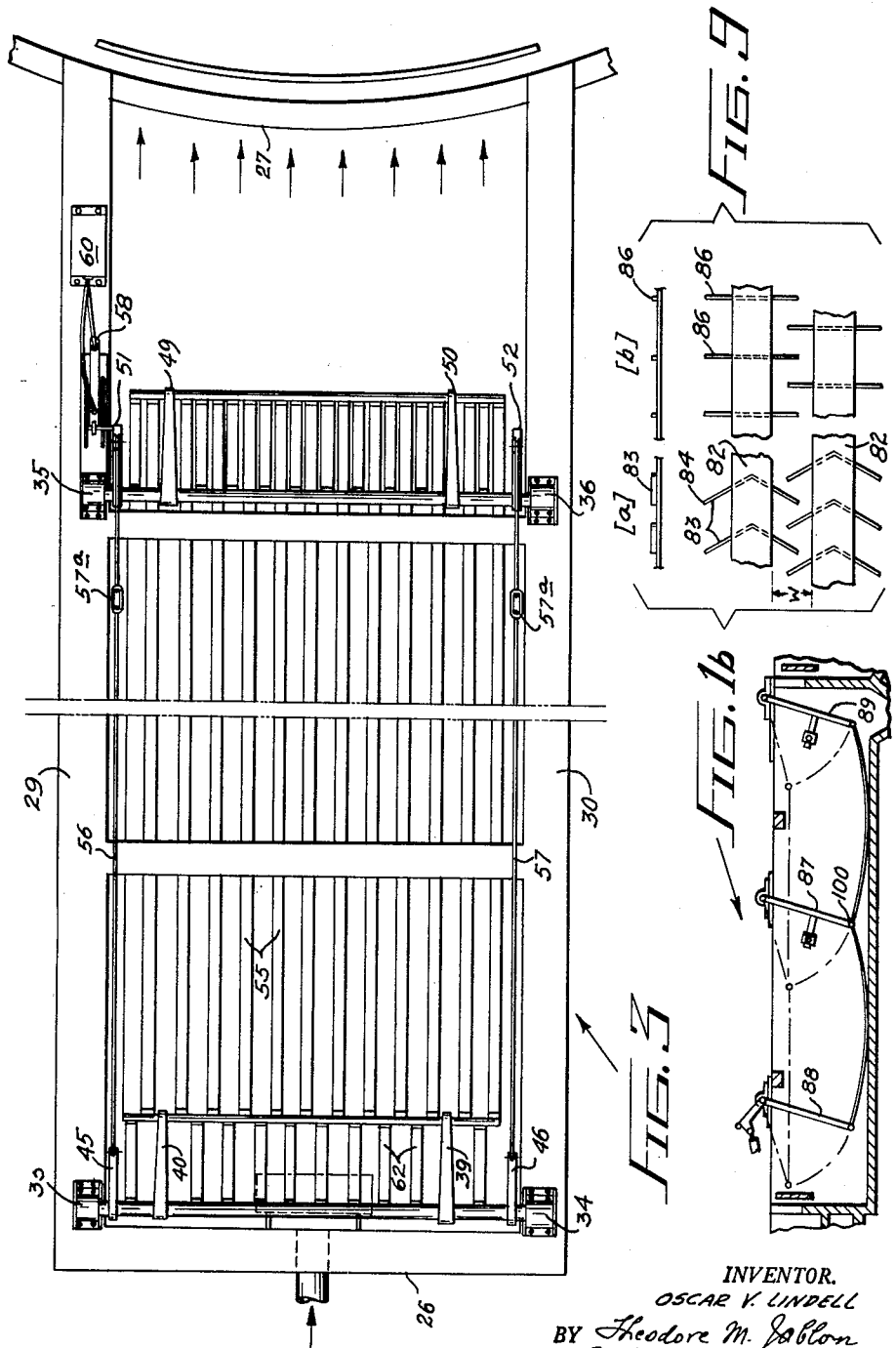

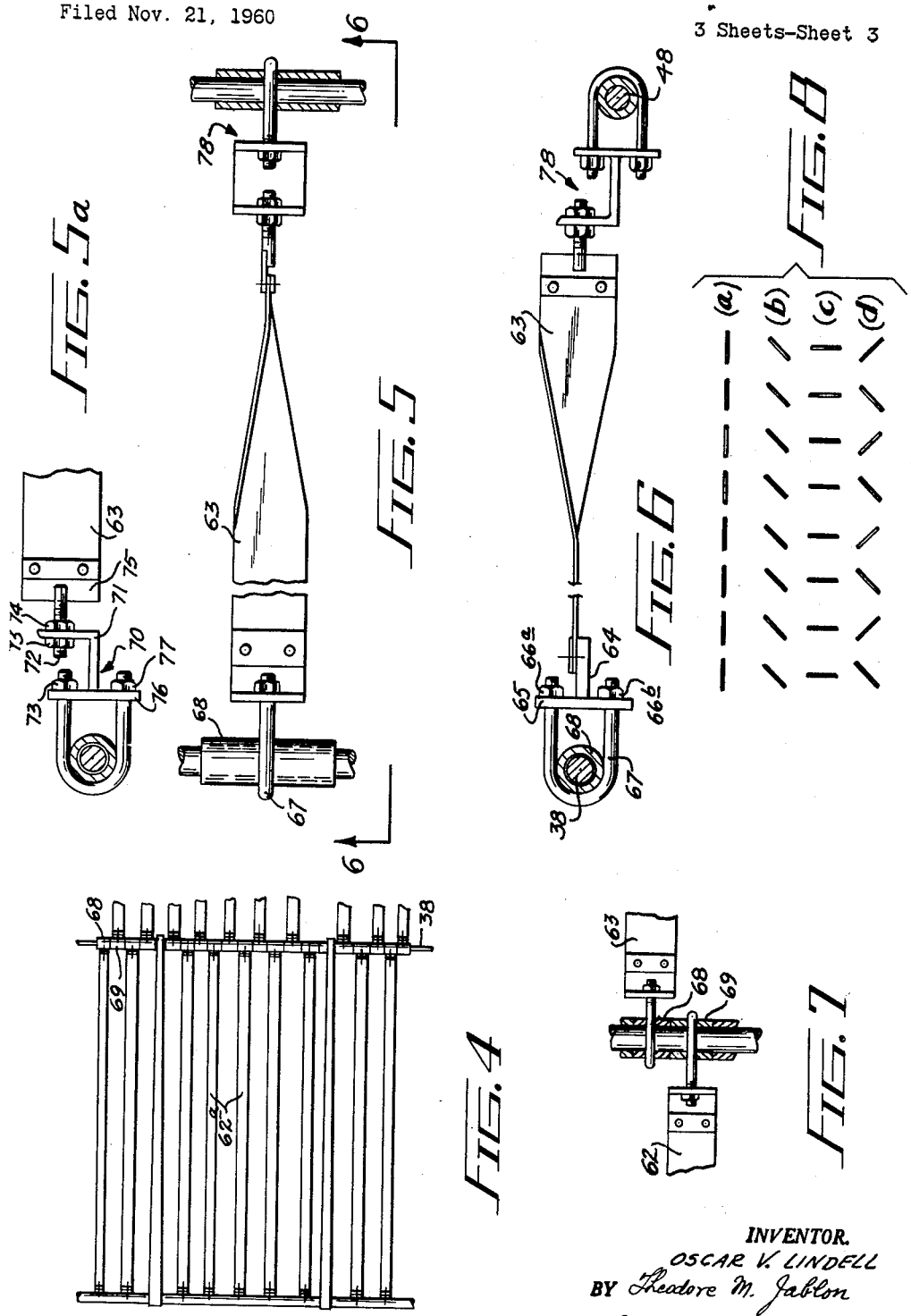

United States Patent Office 3,164,379
Patented Jan. 5, 1965

3,164,379
APPARATUS AND METHOD FOR PURIFICATION OF LIQUIDS
Oscar V. Lindell, New Canaan, Conn., assignor to Dorr-Oliver Incorporated, Stamford, Conn., a corporation of Delaware
Filed Nov. 21, 1960, Ser. No. 70,461
31 Claims. (Cl. 259—100)

This invention relates to the purification of liquids, and more particularly to the operation which involves the flocculating treatment of suspended solids or turbidity by mechanical agitation, preferably with the aid of coagulating chemicals or the like, whereby these solids are rendered in the form of settleable flocs subsequently to be removed as by sedimentation or filtration.

Such liquids, for example, may comprise raw water, sewage, trade wastes, or any liquids from which it is desired to remove suspended solids by way of a flocculation operation with or without the aid of chemicals.

In particular, the invention relates to the horizontal and preferably elongate throughflow type of flocculating tank through which the liquid or water passes from end to end while being subjected to the flocculating effect of the improved agitating mechanism.

One of the objects of this invention is to provide an improved agitating apparatus or mechanism which consists of an especially light and inexpensive construction readily adaptable to a large variety of tank sizes of the aforesaid type, and which in operation is highly effective with respect to uniformly reaching and agitating all portions of the liquid volume in the tank thus achieving uniform floc distribution or floc density throughout the liquid volume and also aiding in the uniform and effective build-up of the flocs.

Another object of this invention requires that the agitating intensity be controllable throughout the tank contents, and preferably in such a manner that the intensity of agitation in the liquid should taper off or have a down gradient towards the effluent end of the tank. Such controlled manner of flocculation operation will prevent the flocs once built up to a maximum or desirable size from being reduced by over-agitation, since fully developed flocs once broken up by over-agitation cannot be reflocculated or reconstituted so that their ability to settle will remain impaired.

The invention also provides that the gradient of flocculating intensity along the tank be adjustable. With such a gradient a relatively higher intensity can be applied in the initial formation of the flocs, while further development and growth of the flocs can be promoted under conditions of gradually decreasing intensity which at the effluent end of the tank may be very gentle and in an extreme case may be close to nil. Improved flocculation results are thus attainable under conditions which tends to avoid the reduction of the larger flocs during the advanced or final phase of their development.

The above stated objects are attainable by the operation of a flexible agitating means or an agitating mechanism that features a horizontal system or bank of agitating elements preferably arranged in a horizontal plane, each of which may consist of a linear flat element of flexible although tough material, for example a ribbon of thin gauge steel or of plastic material such as nylon or the like. This bank of ribbon agitator elements according to the invention is moved up and down reciprocatively in the liquid body in the tank at a flocculation-inducing rate of speed. Hence, depending upon the degree of tension under which they are kept, these agitator elements may sag to form a shallow catenary. Normally, these ribbon elements may operate with their flat faces in a horizontal position and at right angles to the direction of their vertical movement, for effecting maximum intensity of flocculation. Yet, according to a feature of the invention, they may be adjusted angularly about their longitudinal axes so that the ribbon faces extend at an angle to the vertical, in which case the intensity of flocculation is accordingly reduced. In an extreme case these faces may be turned in such a way as to approximate the vertical.

Furthermore, by angularly adjusting only one end of these elements, for instance the one at the effluent end of the tank, the ribbon face may be twisted slightly, for example in such a manner as to be substantially horizontal at the influent end, but to be nearly or substantially vertical at the effluent end of the tank, thereby establishing the aforementioned gradient of flocculation intensity tapering from the influent to the effluent end.

In one embodiment of the invention, the ribbon-shaped agitator elements are operatively supported by at least one pair of swingable depending frames extending from their transverse axis of rotation downwardly into the liquid in the tank.

It is among the advantages of this invention that the improved flocculating mechanism is structurally readily adaptable to tanks of varying length, by the simple device of lengthening or shortening the ribbon-shaped agitator elements. But different tank widths also can be accommodated with little difficulty by accordingly varying the dimensions of the immersed supporting structure, such as the swingable supporting frames, and providing a corresponding number of ribbon elements in the tank.

Other features and advantages will hereinafter appear.

The novel features which are considered as characteristic of the invention are set forth in particular in the appended claims. The invention itself, however, both as to its construction and its method of operation, together with additional objects and advantages thereof will be best understood from the following description of specific embodiment when read in connection with the accompanying drawings, in which:

FIG. 1 is a longitudinal sectional view showing a combined flocculation and sedimentation tank unit, embodying the invention with the ribbon-shaped agitator elements end-wise attached to a pair of swingable frames;

FIG. 1a shows the arrangement of the agitator mechanism of FIG. 1 slightly modified;

FIG. 1b shows another modification of the apparatus;

FIG. 2 is a greatly enlarged view of the flocculation tank section of the treatment unit shown in FIG. 1, although somewhat modified;

FIG. 3 is the plan view of the flocculation tank of FIG. 2, showing more clearly the arrangement of the horizontal ribbon-shaped elements, as well as auxiliary agitator elements mounted on one of the swingable frames;

FIG. 4 is a detail plan view of the swingable frame that carries the auxiliary agitator elements;

FIG. 5 is an enlarged detail plan view taken on line 5—5 of FIG. 2, showing the attachment of the ribbon element including angular adjustment means therefor;

FIG. 5a shows a modification in the manner of attaching the agitator elements of FIG. 5;

FIG. 6 is a side view taken on line 6—6 of FIG. 5;

FIG. 7 is a detail view taken on line 7—7 in FIG. 2, showing the attachment of the horizontal and of the auxiliary agitator elements to the lower end of one supporting frame;

FIG. 8 illustrates diagrammatically various adjustments of the agitator elements;

FIG. 9 shows examples of sediment engaging scraper means provided at the underside of the ribbon-shaped agitator elements.

The improved flocculating apparatus of this invention as herein illustrated is embodied in a continuous water treatment unit exemplified in FIG. 1, combining a flocculating treatment tank section with a sedimentation tank section, so that the latter is horizontally adjacent to and communicates with the flocculating section. In this treatment unit, the flocs formed in the flocculation section pass with the water into the quiescent sedimentation section where they are allowed to settle and to be removed as sludge, while the clarified or purified water overflows.

In this treatment unit, raw water may first enter a chemical dosing station 10, then pass into a communicating flocculating tank section 11 equipped with the improved flocculating agitating mechanism 12 of this invention. Floc-laden liquid from tank section 11 may pass into a communicating settling tank section 13 herein shown to be of the round tank type equipped with well-known rotary power driven sediment raking means 13a.

In this settling tank 13 the settled matter is conveyed by the raking means to the center of the tank and discharged through an outlet indicated at 15, while clarified or purified water freed of its turbidity overflows into the effluent launder 16 for discharge through an outlet connection indicated at 17.

The purpose and mode of operation of the chemical dosing station 10 itself are well known, there being an antechamber 18 for receiving the influent raw water and a feed pipe 19 for introducing softening or coagulant chemical solution at a controllable rate into a mixing chamber 20 communicating with the antechamber. The chemical feed pipe 19 is shown to terminate just below the mixing element or propeller means 21 of a motorized propeller mixer unit 21a, whereby the chemical for example, lime for softening, or other conditioning materials such as alum, soda ash, activated silica, ferrous sulfate, ferric chloride, or others, is mixed with the raw water in a manner to induce thorough utilization of the chemical by prompt reaction thereof with solubles in the water. Such a flash mixing operation and the chemical reaction resulting therefrom initiates the first treatment phase, namely the coagulation of suspended matter or turbidity preparatory to the further step of coalescing or constituting the coagulated matter into the larger and more readily settleable flocs. The reacted liquid in this dosing station then follows an upward path, namely past the propeller means and thus into coagulating chamber 22 which is part of what is herein termed the dosing station and then through a passage 23 and past an influent baffle 24 into the flocculating tank section or tank 11, where the formation of the flocs proper will take place under controlled conditions of agitation.

However, in some instances, according to this invention, such a chemical pretreatment or separate flash mixing station may not be required for the reason that the improved flocculating mechanism of this invention itself will provide flash mixing effects within the influent end of the tank itself, and in a manner to be furthermore described.

According to the invention, the chemical may be introduced directly into the influent end of the tank without necessitating the use of a complete separate dosing station. Hence, a chemical feed pipe 24a (see FIGS. 2 and 3) leads into the influent conduit 25 which feeds the raw water into the flocculating tank.

The flocculating tank in the embodiment of FIGS. 2 and 3 is defined by an influent end wall 26, an effluent end wall 27, the bottom 28, and side walls 29 and 30. In this tank, one embodiment of the agitating flocculating mechanism of this invention, comprises a first supporting frame 31 located at the influent end, and a second supporting frame 32 located at the effluent end of the tank, each of these frames depending into the tank from a transverse horizontal axis about which they are swingable. Hence, frame 31 has a pair of journal bearings 33 and 34, while frame 32 has a pair of journal bearings 35 and 36, all journal bearings for the respective frames being shown mounted upon the top end of the tank.

The first supporting frame 31 comprises an upper horizontal member or shaft member 37 turnable in the aforementioned journals 33 and 34, a lower horizontal member 38 parallel to the shaft member 37, and stay members 39 and 40 parallel to each other and rigidly interconnecting the upper and lower horizontal members of this frame. Furthermore, this frame has rigidly extending therefrom an arm 45 at one side and an arm 46 at the other side parallel and substantially identical to the first arm, both arms extending upwardly from the axis and at an angle "A" relative to the plane of the downwardly extending frame.

Similarly, the second depending frame 32 consists of an upper horizontal member or shaft 47, a lower horizontal member 48, and interconnecting stay members 49 and 50 parallel to each other for rigidly interconnecting the upper and lower members of the frame. This frame also has rigidly extending therefrom at one side an arm 51 similar and parallel to arm 45 of the first frame, and another arm 52 at the other side similar and parallel to arm 46 of the other frame. However, a projection 53 extends from arm 51 to which attaches an actuating mechanism 54 for imparting simultaneous oscillations to the swingable frames 31 and 32. As is clear from FIG. 2, these oscillations are transmitted from frame 32 to frame 31 by way of a bank or group of ribbon-shaped agitator members 55 interconnecting the lower ends of the depending frames 31 and 32, together with a pair of tension members or wires 56 and 57 interconnecting the upward arms 45 and 46 of the one frame with the upward arms 51 and 52 respectively of the other frame. Each of these tension wires is shown to have a tension adjusting device, for example a turn buckle device 57a enabling the tension of the agitator elements 55 to be adjusted to whatever extent may be desired, thus controlling the degree of sag or catenary shape assumed by these agitator elements.

In the example of FIG. 2, the tensioning adjustment of the tension wires is such as to keep the agitator elements below tensioned sufficiently to maintain them spaced from the tank bottom as illustrated in this instance. However, according to a feature the tensioning adjustment and other arrangements may be such as to allow for a greater sag of the agitator elements, so they may act as dredging or sediment conveying elements for moving gritty matter or the like heavier than the flocs, in step-wise fashion to a bottom outlet means. To this end, additional sediment engaging means or blades may be provided on these agitator elements preferably at the underside thereof, such as will be described below in further embodiments of the invention.

In FIGS. 2 and 3, the actuating mechanism 54 as herein exemplified comprises a hydraulic actuating cylinder 58 mounted upon a base 59, so as to be swingable on trunnions about an horizontal axis which is parallel to the axes of the aforementioned supporting frames 31 and 32. Operating accessories 60 are indicated for the operation of the hydraulic cylinder, such as may include a pump and reservoir, etc. for handling the pressure operating fluid. This may also include timing or other control devices for varying the frequency of the oscillations of the frames and thus the rate of speed of the up and down movement of the horizontal agitator elements and consequently also varying the intensity of agitation incident to floc formation. Instead of only a single actuator a pair of hydraulic power actuators may be provided in symmetrical arrangement, each attached to a respective upwardly directed arm of the supporting frame 32, with both hydraulic power cylinders hydraulically interconnected and balanced so that an equal drive impulse or torque may be applied to either side of this frame. Furthermore, by varying the effective length of the power stroke of the cylinders, control may be exercised whereby the extent of travel or the angle "B" between upper and lower limit positions of the supporting frames may be varied to suit special operating conditions and requirements. Also, the frequency of the oscillations may be changed as by the adjustment of timing devices, or of pressure fluid throttling means.

The frame 31 according to the FIG. 2 embodiment has one or more weighted arms or a weighted structure 61 upon which weight means 62 are adjustable, for imposing a desired degree of tension upon the agitator elements 55 even though the tension wires 56 and 57 may be relatively slack.

In distinction from FIG. 1, FIG. 2 omits the separate complete chemical dosing station 10, and shows the coagulant chemical or the like being introduced directly into the raw water influent pipe 51 as by the chemical supply pipe 24, in order that further mixing of the conditioning chemical with the water may be effected initially within the tank itself, the entering water flowing past an influent baffle 61. Thus, to effect flash mixing of chemical with raw water inside the tank, the invention (see FIG. 4) provides a set of auxiliary agitator elements 62a mounted upon the frame 31 located close to the influent end of the tank, which agitator elements are, therefore, more or less inclined when in operation. While these auxiliary agitator elements 62a may assume other forms and structural configurations, they are here shown to be in the nature of ribbon-shaped elements preferably parallel to one another, and substantially similar in details of construction, and in the manner of mounting to the main agitator members 55.

Structural details of one embodiment of the horizontal agitator members or bands 55 including the terminal means for the attachment thereof to the supporting frames, are illustrated in FIGS. 5, 5A, 6 and 7. In this arrangement, a ribbon element or band 63, corresponding to bands 55 in FIG. 3, preferably consists of a material that is thin, flexible, as well as resilient, and at the same time has sufficient body or semi-stiffness to enable it to maintain its shape or face in a desired plane during its up and down movement through the liquid in the tank. All the bands may be arranged to extend in parallel to each other and with their faces extending flat-wise substantially in a horizontal plane, as indicated in the example of FIGS. 2 and 3. According to the details in FIGS. 5 to 7, the ends of these bands 63 have terminal devices at each end attaching them to the respective lower ends of the swingable supporting frames, yet in such a manner as to enable them to be angularly adjusted about their horizontal axis so that at least part of these bands may be positioned with the plane of the faces thereof extending inclined at an angle to the horizontal. Such angular adjustment of these bands may be accomplished for instance by a twist given to the band, such that the face of the influent end thereof will extend substantially in the horizontal plane thus to provide a relatively high degree of intensity of agitation, but with the face of the effluent end of the band extending at an angle to the horizontal thereby diminishing the intensity of agitation.

Such a twisted shape of the band is diagrammatically exemplified in FIG. 8 wherein the band may have been given, for example, a quarter twist or turn resulting in the respective conditions shown in FIGS. 8(a) to 8(c) representing cross-sections taken at various points along the bands. Thus, FIG. 8(a) represents a section through the influent end of the band showing the bands arranged parallel edge to edge in a substantially horizontal plane with consequent greater intensity of agitation, FIG. 8(c) representing a section through the effluent end of the bands showing their faces extending in a more nearly vertical plane with agitation thus minimized, while FIG. 8(b) represents a section through an intermediate portion of the bands showing them inclined at an angle to the horizontal providing an intermediate degree of intensity of agitation. Furthermore, the cross-section shown through an arrangement of bands according to FIG. 8(d) illustrates an adjustment of the bands whereby the planes of the faces of mutually adjoining bands are inclined at an angle to the horizontal as well as inclined towards each other or away from each other respectively.

Not only angular, but also length adjustments of the bands may be effected by the provision of shackle devices, examples of which are illustrated in the detail FIGS. 5 to 7, whereby the ends of the bands are adjustably fastened to the swingable supporting frames 31 and 32. According to FIGS. 5 and 6, the influent end of the bands has fastened thereto a T-shaped bracket member 64 the cross piece 65 of which is held by nuts 66a and 66b on a U-shaped anchoring bolt 67 surrounding a sleeve member 68 which is loose and turnable on the lower transverse member of the supporting frame which is located close to the influent end of the tank.

Referring for the moment to FIGS. 4 and 7, it will be seen that the sleeve members 68 alternate with sleeve members 69, the latter having attached thereto the lower ends of the aforementioned auxiliary ribbon-shaped agitator members 62 the upper ends of which in turn are attached to the upper transverse shaft member of the supporting frame.

Another mode of attaching the influent ends of the bands to allow for angular adjustment about their respective longitudinal axes, is illustrated in FIG. 5a, this embodiment providing a bracket member 70 which has an angle-shaped portion 71 holding an anchoring bolt 72 by means of nuts 73 and 74, which anchoring bolt is fastened in some suitable manner as by a clip member 75 or the like to the end of the agitator band 63. The cross piece or transverse outer end portion 76 of this bracket member is held by nuts 77 on respective ends of a U-shaped anchoring bolt which may be similar to the bolt 67 shown in the arrangement of FIG. 5.

Reverting to FIGS. 5 and 6, it will be seen that angular adjustability of the effluent end of the bands may be attained by means of terminal shackle devices 78 provided at the respective ends of the bands in a manner similar to those just described in connection with the embodiment in FIG. 5a, such device permitting of angular adjustment of the bands about their longitudinal axes whereby the bands may be twisted to any degree desired.

In the embodiment of FIG. 1a serving a different mode of operation, the arrangement of swingable supporting frames 79 and 80 is shown the reverse of that in FIG. 2, so that here the hydraulic actuator device 54 is located at the left or influent end of the tank as indicated by the cylinder 58 thereof. Moreover, the interconnecting tension wires 56 and 57 between the supporting frames appearing at the top of FIG. 2, are here omitted. But, on the supporting frame 80 there is provided a weighted arm or structure 81 carrying adjustable weighting means, while agitator bands 82 represent the sole motion-transmitting connection between the supporting frames. The sag of these bands as controlled by the adjustable weights 81 on frame 80 or by other means, may be such that these bands by contact with the tank bottom are utilized and employed for imparting one-way conveying movements to any solids heavier than the suspended flocs, that may have settled with the passage of the floc laden liquid through the tank. Hence, sediment engaging means or blades as exemplified in the arrangements of FIG. 9 may be provided at the underside of the agitator elements or bands 82 so that due to the sag they will engage the sediment or gritty matter when the bands are moving in the one direction, namely towards a sump S with discharge connection M, but will disengage from the tank bottom and from this sediment when these bands are rendered taut while moving in the opposite direction.

Referring to the details shown in FIG. 9, the embodiment (a) of FIG. 9 presents a pair of mutually adjoining agitator bands 82 spaced from each other by a lane having a width "w." These bands may have fastened to the lower face thereof sediment engaging blades 83 of shallow V-shaped configuration pointed in the direction of the sediment engaging stroke or movement of the bands. The wing portions 84 of these V-shaped blades project laterally and horizontally beyond the respective side edges of the band, so they will move not only the sediment that lies directly underneath the band, but also the material settled in the lanes between the bands. Preferably, the projecting end portions of these V-shaped blades of one band have overlapping relationship in the lanes with similarly projecting blade end portions of the next adjoining band so that in this way positive one-way conveying movement is imparted to the settled solids accumulated in these lanes. In the embodiment (b) of FIG. 9, the sediment engaging means are shown in the form of straight transverse blades 86 rather than the V-shape form, but otherwise equally featuring the lateral overlap relationship in the lanes, between the sets of blades of respective mutually adjoining bands.

In view of the foregoing description, it will be understood that the underlying concept of employing a bank or group of horizontal agitator bands arranged for up and down reciprocation in the liquid in the tank, is capable of a number of different arrangements within the scope of this invention. For example, the lower ends of the auxiliary agitator bands 62 and the influent ends of the main horizontal agitator bands 55 may be attached to separate parallel transverse members provided on the supporting frame, in which case there would be no need for the arrangement of a single row of the alternating short sleeves 68 and 69 illustrated in FIG. 7.

Furthermore, additional banks or groups of horizontal agitator bands may be provided upon the swingable supporting frames, requiring corresponding intermediate transverse horizontal members on these frames, to which these additional agitator bands may be attached by their respective ends. With such multiple bank arrangement of the bands, the bands of an upper bank may be staggered relative to the bands of a subjacent bank so that the bands of the upper bank will register with the lanes between the bands of the subjacent bank. The required extent of the angular swinging movement of the supporting frames may then be accordingly reduced. Furthermore, where a twist of the bands by angular adjustment about their axes is desired, the extent of such twist or turn may range from a fraction to a multiple of a turn, depending upon individual operating conditions and the effects desired.

In the case of especially long tanks, intermediate operating support may be provided for the flexible agitating elements which otherwise would extend in a single long catenary between the respective movable supporting structures to which they are attached at their respective ends. Such an arrangement with intermediate support is exemplified in FIG. 1(b) where the tank is provided with a third swingable supporting frame 87 which may be located halfway between the end frames 88 and 89, and which may be of similar construction. Consequently, this intermediate supporting frame may have its lower end 100 connected to the inner ends of flexible agitating elements at half length.

In the operation of this invention, taking the treatment of raw water for example, and referring to the embodiment of FIG. 1, it is noted that the horizontal axis of the first swingable supporting frame is spaced a substantial distance from the influent end of the tank to allow for swinging movement of this frame towards and away with respect to the influent end wall of the tank. The turbid raw water entering the combined dosing and mixing station 10 above described is subjected therein first to dosing with the coagulant chemical solution and then immediately thoroughly mixed by the propeller of the flash mixing unit 21a. The chemical supplied at a controllable rate through pipe 19 flows from the dosing chamber 20 past the propeller of the mixing unit and then through the mixing chamber 22 and from there through the communicating passage 23 and past the influent baffle 24 into the flocculating tank 11, carrying with it the coagulated impurities resulting from this chemical preconditioning. While passing through the flocculating tank 11 from the influent to the effluent end thereof the liquid is subjected to relatively mild controlled agitation by the agitator elements or bands 55 being moved up and down by the mechanism of this invention at a relatively slow rate of speed, in the net, say, between ½ ft. and 2 ft. per second vertical, to convert the coagulated but as yet unsettleable suspended matter into the larger flocs of suitable settleable characteristics. The movement of these agitator bands as effected by the operation of the mechanism of this invention, covers substantially uniformly the entire volume of the tank thereby affording good tank utilization as well as effective well-controlled floc formation.

It will be further seen, that with the swinging movement of the supporting frames the vertical speed component in the movement of the bands is low while the bands are near the tank bottom but increases along the upward arcuate path described by the lower ends of the supporting frames. Nevertheless, by controlling the supply of pressure fluid to the hydraulic power cylinder, such speed changes may be compensated for or averaged out to some extent by throttling or controlling the supply of pressure fluid to the power cylinders. In this way, acceleration or retardation in the movement of the bands are readily controllable. However, a slow initial vertical speed component may be desirable where the agitator bands are allowed to sag, as illustrated in FIG. 1a, so that they may serve for imparting one-way stepwise movement to any heavy or gritty settled solids along the tank bottom towards the sump S for discharge through the outlet means M which may be located at the effluent end of the flocculating tank. Such one-way sediment conveying movement by the flocculating mechanism itself may be obtained for instance if the agitator bands have sufficient slack to engage the sediment when moving in one direction, namely towards the sediment discharge end, but are kept taut and out of contact with the sediment when moving in the opposite direction. The arrangement of FIG. 1(a) provides such an effect by allowing the driven supporting frame 32 to lag only during the sediment conveying stroke in accordance with, and as a result of, the adjustment of the weights 81 thereon. But with the arrangement shown in FIG. 1, a sediment conveying effect may equally be attainable by suitably correlated adjustment of both the tension wires 56 and 57 and of the weights.

When operating in accordance with the embodiment of FIG. 2, with the chemical dosing solution or coagulating agent supplied directly by the supply pipe 24 into the influent end of the flocculating tank, the auxiliary agitator elements or bands 62 provided on the adjacent supporting frame 31 are relied upon to provide the flash mixing effects previously mentioned for inducing prompt chemical reaction as well as the desired coagulation of turbidity imparting matter. In this embodiment, the horizontal turning axis of the supporting frame 31 is located close to the influent end wall 26 of the tank, the swinging movement of the frame being so regulated that when in its lowermost position it will stay clear of the influent baffle 61. This baffle itself in this instance is slanted at an acute angle to the vertical and thus substantially parallel to the plane of the adjacent supporting frame 31 at the time that this frame reaches a predetermined lowermost position proximate to the influent end wall of the tank shown.

The intensity of the flocculating effects is variable for example, by various measures one of which lies in adjusting or varying the rate of speed of the agitator elements in controlling the operation of the power drive cylinder, another one of which lies in establishing a suitable gradient of intensity of agitation along the path of the liquid from the influent to the effluent end of the tank as accomplished by individual angular adjustment of the agitator bands in the manner set forth above, both measures being applicable singly or in combination. During its passage through the flocculating tank 11 and while undergoing the floc producing controlled gentle agitation, the water nevertheless will have had any heavy, gritty solids or the like separated from the suspended flocs, by settling on the bottom of the flocculating tank whence they may be removed in any suitable manner but preferably according to this invention by the dredging action of the agitating elements or bands themselves in the manner fully set forth and described above. Thus, in the embodiment of FIG. 1a, these heavier solids are propelled into the separate sump "S" for discharge located at the effluent end of the flocculating tank, whereas in the embodiment of FIG. 2 these solids are induced to migrate through a passage "P," thus being transferred from the bottom of the flocculating tank 11 onto the bottom of the settling tank 13 where they may come under the influence of the rotary rake structure 13a to be removed via the discharge facilities of this tank.

At the same time, the water carrying the fully developed flocs will flow from the flocculating tank into the communicating settling tank 13 allowing the flocs to settle therein, while clarified water freed of its turbidity will overflow the weir of the settling tank into the receiving launder 16, even while the rotating rake structure 13a is moving settled flocs and other settled matter into the central sump and then through the discharge facilities thereof to disposal.

From the foregoing it will be seen that the invention provides an improved apparatus as well as method for effecting the removal of turbidity matter from raw water by way of flocculation combined with subsequent sedimentation of the flocs, wherein the flocculating mechanism is readily and inexpensively adaptable to a rectangular or longitudinal type of flocculating tank. The construction of this mechanism is readily applicable to variously sized tanks, especially with respect to length because it affords a simple means of adaptation by simply lengthening or shortening the agitator bands to suit the length of the tank. This apparatus is not only extremely simple in construction and relatively inexpensive to produce and to install, but it also affords a high degree of controllability of the flocculation operation itself and thus of the size of the flocs to be formed, and at the same time it affords a high degree of utilization of the available tank volume for carrying out the flocculation operation while preserving flocs of maximum size until they are released to the subsequent floc settling operation.

It will be understood that each of the elements described above, or two or more together, may also find useful application in other types of flocculating treatment systems differing from the types described above.

While the invention has been illustrated and described as embodied in a flocculating treatment system for removing turbidity from raw water, it is not intended to be limited to the details shown, since various modifications and structural changes may be made without departing in any way from the spirit of this invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalents of the following claims.

Whereas the foregoing embodiments illustrate the feature that the provision of the ribbon elements make this agitating apparatus readily adaptable to any length of tank, it may be noted that tanks of exceptional length or where otherwise desired, an intermediate or idler supporting frame for the ribbon elements may be provided say half way between the two swingable end supporting frames for the ribbon elements. This idler supporting frame will swing in unison with the other frames. In a practical instance, one set of ribbon elements may be connected to and extend from the intermediate supporting frame to the supporting frame located at the influent end of the tank, while another set of ribbon elements may be connected to and extend from the intermediate frame to the supporting frame located at the effluent end of the tank.

I claim:
1. In a horizontal liquid treatment tank through which a liquid flows from an influent end to an effluent end, agitating apparatus comprising, a bank of substantially horizontal and substantially parallel agitator elements of ribbon-shaped configuration consisting of a flexible and relatively thin material extending in said tank between the influent end and the effluent thereof; a first supporting frame located at said influent end of the tank and mounted for swinging movement about a horizontal axis extending transversely of the flow through the tank, said frame extending downwardly into said tank and having a transverse member spaced from said horizontal axis for attachment thereto of one end of said agitator elements; a second supporting frame located at said effluent end of the tank and mounted for swinging movement about a horizontal axis extending transversely of the flow through the tank, said frame extending downwardly into said tank and having a transverse member spaced from said horizontal axis for attachment thereto of the other end of said agitator elements; and actuating means for oscillating said swingable frames substantially in unison while maintaining said agitator elements horizontally oriented whereby said bank of agitator elements is moved reciprocatively up and down in said tank to effect flocculation inducing agitation in the liquid by said elements.

2. The apparatus according to claim 1, with the addition of at least a third swingable frame located between and spaced from said first and second swingable frames and also movable about a horizontal axis; and means for supportingly attaching the lower end of said third frame to a corresponding point of said agitator elements so that said third frame will swing substantially in unison with said first and second frames.

3. The apparatus according to claim 1, wherein at least a portion of each agitator element is angularly adjustable about its respective longitudinal axis by way of the angular adjustment of at least one end thereof.

4. The apparatus according to claim 1, wherein at least a portion of each agitator element is angularly adjustable about its respective longitudial axis by way of angular adjustment of at least that end thereof which is adjacent to the effluent end of the tank, so that said elements during the up-and-down movement thereof operate with a gradient of agitation decreasing from the influent end to the effluent end of the tank.

5. The apparatus according to claim 1, wherein auxiliary elongate agitator elements are provided upon said first swingable frame adjacent to the influent of the tank.

6. The apparatus according to claim 1, wherein each said swingable frame has a crank arm extending upwardly from said horizontal axis, with the addition of a connecting element between the upper ends of said crank arms, and wherein said actuating means comprise a reciprocating drive engaging one of said upwardly extending arms.

7. The apparatus according to claim 1, wherein each said swingable frame has a crank arm extending upwardly from said horizontal axis, with the addition of a connecting element between the upper ends of said crank arms, with adjustable tensioning means for said connecting element.

8. The apparatus according to claim 1, wherein said actuating means comprise hydraulic power cylinder means to effect the oscillation of said swingable frames.

9. The apparatus according to claim 1, wherein each said swingable frame has a crank arm extending upwardly from said horizontal axis, with the addition of a connecting element between the upper ends of said crank arms, and wherein said actuating means comprise a reciprocating drive engaging one of said upwardly extending arms, with the addition of weight means associated with the other swingable frame effective to impart a corresponding amount of tension to said agitator elements.

10. In a horizontal liquid treatment tank through which a liquid passes from an influent end to an effluent end, agitating apparatus comprising, a substantially horizontal bank of substantially parallel agitator elements of ribbon-shaped configuration consisting of a flexible and substantially thin material extending between opposite walls in said tank, a first supporting frame located at said influent end of the tank and mounted for swinging movement about a horizontal axis extending transversely of the tank, said frame extending downwardly into said tank and having a transverse member spaced from said horizontal axis for attachment thereto of one end of said agitator elements, a second supporting frame located at said effluent end of the tank and mounted for swinging movement about a horizontal axis extending transversely of the tank, said frame extending downwardly into said tank and having a transverse member spaced from said horizontal axis for attachment thereto of the other end of said agitator elements, actuating means operatively connected to one of said swingable frames for oscillating said swingable frames substantially in unison while maintaining said agitator elements horizontally oriented to effect agitation in said liquid by said elements, and weight means carried by the second swingable frame effective to maintain tension in said agitator elements, while being oscillated and driven by said first swingable frame through said agitator elements.

11. The apparatus according to claim 10, wherein said agitator elements have dredging means provided on the lower face thereof.

12. In a horizontal liquid treatment tank through which liquid passes from the influent end to the effluent end, agitating apparatus comprising substantially horizontal flexible agitator means suspended between opposite walls of the tank in catenary fashion, and provided with agitating faces effective during up and down movement of said agitator means; separate structures for endwise operatively supporting said agitator means so as to allow for bodily up and down reciprocatory movement thereof to effect agitation in said liquid by said agitator means; and actuating means for said structures to impart said movement to said agitator means.

13. In a horizontal through-flow type of liquid treatment tank, an agitating apparatus which comprises a first frame structure mounted to be movable about an axis so arranged that at least a portion of said frame structure is moved through at least a portion of the liquid body in the tank; a second frame structure mounted to be movable about an axis parallel to, and spaced a substantial horizontal distance from said first axis, agitating means interconnecting said frame structures at points spaced from their respective axes; and actuating means for moving said frame structures to effect reciprocating movement of said agitating means in said liquid body.

14. The apparatus according to claim 13, wherein the axes upon which said frame structures are moved are horizontally arranged.

15. The apparatus according to claim 13, wherein said agitating means substantially comprise flexible sheet material.

16. The apparatus according to claim 13, wherein said agitating means comprise an assembly of linear elements spaced from one another.

17. The apparatus according to claim 13, wherein said agitating means comprise an assembly of linear fexible elements.

18. The apparatus according to claim 13, wherein said agitating means comprise an assembly of linear ribbon shaped elements spaced from one another.

19. The apparatus according to claim 13, wherein said agitating means comprise elements constituting catenaries.

20. In a horizontal through-flow type of liquid treatment tank, agitating apparatus, which comprises a substantially horizontal assembly of agitator elements of ribbon shaped configuration consisting of a flexible and relatively thin tough material arranged between the ends of the tank, structure for endwise operatively supporting said assembly of agitator elements for bodily up and down reciprocatory movement thereof to effect agitation in said liquid by said elements, at least a portion of said agitator elements being angularly adjustable about their respective longitudinal axes by way of angular adjustment of at least one end thereof, and actuating means for said structure to impart said movement to said elements.

21. In a horizontal through-flow type of liquid treatment tank having ends, agitating apparatus which comprises a substantially horizontal assembly of agitator elements of ribbon shaped configuration consisting of a flexible and relatively thin tough material arranged between ends of the tank, structure for endwise operatively supporting said assembly of agitator elements for bodily up and down reciprocating movement thereof to effect agitation in said liquid by said elements, at least a portion of said agitator elements being angularly adjusable about their respective longitudinal axis by way of angular adjustment of at least that end thereof which is adjacent to one end of the tank, so that said elements during the up and down movement thereof operate with a gradient of agitation from the other end to the one end of the tank, and actuating means for said structure to impart said movement to said elements, with a gradient of agitation decreasing from the other end to the one end of the tank.

22. In a horizontal liquid treatment tank through which liquid passes from an influent to an affluent end, a flocculation inducing agitating apparatus comprising, a substantially horizontal bank of agitator elements of ribbon-shaped configuration consisting of a tough, flexible and relatively thin material arranged between the influent end and the effluent end thereof; a separate structure for movably supporting respective ends of said ribbon elements; stationary bearing means operatively supporting said structures so as to be movable to impart up-and-down reciprocating movement to said bank of agitator elements while maintaining them substantially horizontally oriented to effect flocculation inducing agitation in said liquid by said elements; actuating means for moving said supporting structures to impart said movement to said agitator elements, and means for angularly adjusting said agitator elements about their respective longitudinal axes.

23. In a horizontal liquid treatment tank through which liquid passes from an influent to an effluent end, a fluocculation inducing agitating apparatus comprising, a substantially horizontal bank of agitator elements of ribbon-shaped configuration consisting of a tough, flexible and relatively thin material arranged between the influent end and the effluent end thereof; a separate structure for movably supportnig respective ends of said ribbon elements, stationary bearing means operatively supporting said structures so as to be movable to impart up-and-down reciprocating movement to said bank of agitator elements while maintaining them substantially horizontally oriented to effect floccuation inducing agitation in said liquid by said elements; and actuating means for moving said supporting structures to impart said movement to said agitator elements, means for angularly adjusting at least one end of said agitator elements about their respective longitudinal axes, said one end being adjacent to the effluent end of the tank, so that said elements during the up-and-down movement thereof operate with a gradient of agitation decreasing from the influent to the effluent end of the tank.

24. In a horizontal liquid treatment tank through which liquid passes from the influent end to the effluent end, an agitating apparatus comprising a substantially horizontal bank of agitator elements of ribbon-shaped configuration consisting of a tough flexible and relatively thin material having oppositely disposed substantially flat faces suspended between opposite walls of the tank in catenary fashion, the flat faces of said ribbon shaped elements presenting agitating faces, and means operatively supporting said elements, so as to provide for bodily up-and-down reciprocatory movement thereof to effect agitation in said liquid by said elements.

25. In a horizontal through flow type of liquid treatment tank, an agitating apparatus which comprises flexibly deformable agitating means extending in the body of liquid in the tank between opposite walls thereof and supported at horizontally spaced ends, a first movable structure mounted to pivotally support one end of said agitating means for moving said agitating means horizontally along a predetermined path in the direction of movement of said first structure, first means for supporting and for guiding said first movable structure in its movement, a second movable structure mounted to pivotally support the other end of said agitating means for moving along a substantially similar predetermined path incident to movement of said second structure, second means spaced from and parallel to said first supporting means for supporting and for guiding said second movable structure in its movement, and actuating means for moving said movable structures, thereby effecting movement of said agitating means within the body of liquid with the resulting pull at each end of said agitating means absorbed by the respective movable structures and supporting means.

26. The apparatus according to claim 25, wherein said agitating means comprise flexible sheet material.

27. The apparatus according to claim 25, wherein said agitating means comprise an assembly of linear elements spaced from one another.

28. The apparatus according to claim 25, wherein said agitating means comprise an assembly of flexible linear elements of ribbon shape spaced from one another.

29. In a horizontal throughflow type of liquid treatment tank having walls, an agitating apparatus which comprises flexible agitating means extending in a body of liquid in the tank between opposite walls thereof, a first supporting means adjacent one said wall for supporting one end portion of said agitating means, a second supporting means adjacent the opposite said wall for supporting the opposite end of said agitating means, and actuating means connected to at least one of the supporting means to effect movement of the flexible agitating means through the body of liquid.

30. The method of maintaining agitation of a body of liquid contained in a tank comprising providing flexible, deformable agitating means in the body, supporting the agitating means in the tank at horizontally spaced ends thereof in a slack condition, applying power to at least one end portion of the flexible agitating means to impart reciprocatory movement thereof through the body of liquid, while maintaining the agitating means flexible.

31. The method as set forth in claim 30, wherein the agitating means are supported in a catenary fashion and are moved through a predetermined path through the body of liquid.

References Cited in the file of this patent

UNITED STATES PATENTS 2,101,810    Fischer _____ Dec. 7, 1937